United States Patent [19]

Ripoll et al.

[11] Patent Number: 5,752,257
[45] Date of Patent: May 12, 1998

[54] REDUNDANT ARRAY OF REMOVABLE CARTRIDGE DISK DRIVES

[75] Inventors: Jean-Louis Ripoll; Marc Frouin, both of Avranches, France; Frederic Janon, Mountain View, Calif.

[73] Assignee: Nomai SA, Avranches cedex, France

[21] Appl. No.: 283,094

[22] Filed: Jul. 29, 1994

[51] Int. Cl.[6] .................................................. G06F 12/16
[52] U.S. Cl. ........................................ 711/114; 395/182.04
[58] Field of Search ................................. 395/441, 439, 395/182.05, 442, 182.03, 182.04

[56] References Cited

U.S. PATENT DOCUMENTS

| | | | |
|---|---|---|---|
| 4,092,732 | 5/1978 | Ouchi | 364/900 |
| 5,325,497 | 6/1994 | Jaffe | 395/425 |
| 5,369,758 | 11/1994 | Larson | 395/182.05 |
| 5,398,253 | 3/1995 | Gordon | 371/40.4 |
| 5,412,791 | 5/1995 | Martin | 395/441 |
| 5,483,419 | 1/1996 | Kaczeus | 361/685 |
| 5,564,033 | 10/1996 | Takekuma | 395/442 |

OTHER PUBLICATIONS

Storage: removable 3-5 inch disk drives bring end users new data storage flexibility, Edge: Work Group Computing Report, Jul. 26, 1993, p. 20.
Storage: IBM AS/400 DASD alternative, Edge: Workgroup Computing Report, Mar. 22, 1993, p. 48.
Disk Arrays Explained, Roger C. Alford, BYTE Magazine, Oct. 1992, p. 259.
RAID to the rescue, PC Magazine, Sep. 14, 1993, p. 273.

Primary Examiner—Tod R. Swann
Assistant Examiner—Christopher S. Chow
Attorney, Agent, or Firm—Thomas E. Schatzel; Law Offices of Thomas E. Schatzel

[57] ABSTRACT

A memory system comprises an array of parallel removable hard disk cartridges and matching drives. Each cartridge is recorded with an array position signature so that an array can be programmatically reconstructed each time the cartridges are loaded in their drives without regard to the original physical associations of cartridges to drives.

3 Claims, 3 Drawing Sheets

REDUNDANT ARRAY OF REMOVABLE CARTRIDGE DISK DRIVES

BACKGROUND OF THE INVENTION

1. Field of the Invention

The invention relates generally to computer memory and more specifically to removable hard disk cartridges and disk drives.

2. Description of the Prior Art

Redundant arrays of inexpensive disk drives (RAID) are one approach to offering large capacity, fast access memory for data processing. The duplication of data storage in each of the redundant drives adds a measure of security because a single drive failure is unlikely to cause a complete loss of any data element.

Hard disks are constantly being improved in both their performance and capacity. However, some data processing centers handle so much data it is not possible to keep it all on-line all the time. Magnetic tape systems have been traditionally used to archive computer data for later use. However, the storage and access of data on tape is clumsy and can be very slow.

Large nine-inch and twelve-inch optical storage disks have recently also become popular for large capacity storage systems. Optical disks offer random access and removability, but such systems are very expensive and the ability to write data on-line is limited because most optical disks can only be written once.

Magnetic tape and optical storage systems offer practically unlimited data storage capacity because the tapes themselves can be dismounted and placed on an archive library shelf. Removable hard disk drives have magnetic disk cartridges that can also be dismounted and placed in an archive.

SUMMARY OF THE PRESENT INVENTION

It is therefore an object of the present invention to provide an on-line, memory system with very high data reliability.

It is an object of the present invention to provide a system of redundant arrays of removable hard disk drives.

It is another object of the present invention to provide a very fast, very large storage capacity, parallel removable cartridges in a system that can replace a single hard disk drive.

It is an object of the present invention to provide a memory system comprised of inexpensive hard disk cartridge drives.

It is a further object of the present invention to provide a removable hard disk cartridge memory system.

Briefly, a memory system embodiment of the present invention comprises an array of parallel removable hard disk cartridges and matching drives. Each cartridge is recorded with an array position signature so that an array can be programmatically reconstructed each time the cartridges are loaded in their drives without regard to the original physical associations of cartridges to drives.

An advantage of the present invention is that a memory system is provided that uses removable cartridges for data storage.

Another advantage of the present invention is that a redundant array of inexpensive removable hard disk drives is provided for highly reliable, on-line storage of relatively large amounts of data.

These and other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMBODIMENT

Figure 1:
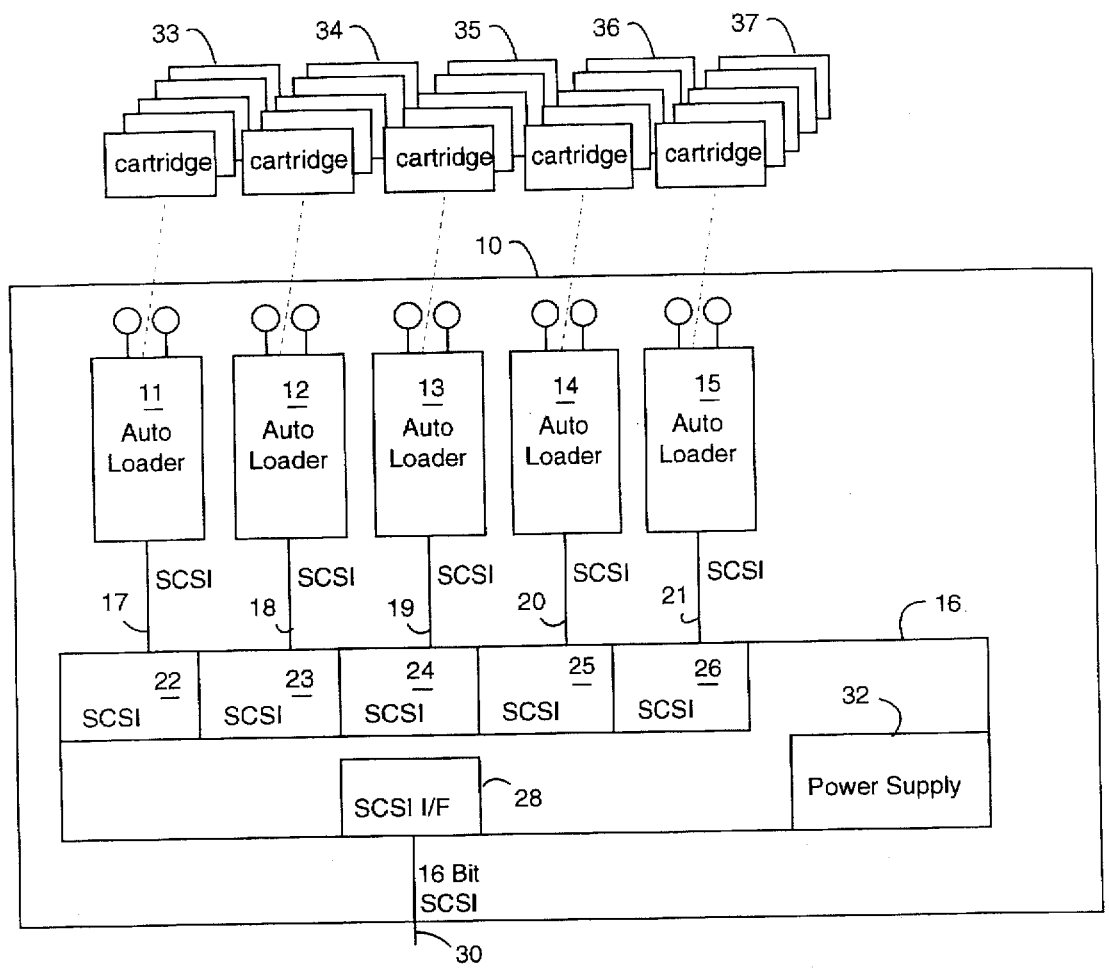
FIG. 1 is block diagram of a memory system embodiment of the present invention.

FIG. 1 illustrates a memory system embodiment of the present invention, referred to herein by the general reference numeral 10. Memory system 10 comprises an array of autoloaders 11–15 connected to a control unit 16. A set of individual small computer system interface cables (SCSI) 17–21 connect respective ones of the autoloaders 11–15 to a set of SCSI drive controller interfaces 22–26. During operation, a SCSI host interface 28 allows the memory system 10 to appear to be a single, very large capacity hard disk drive through a SCSI connector 30. A power supply 32 provides DC operating power to the memory system 10.

A group of removable hard disk cartridges 33 are associated with the autoloader 11. A group of removable hard disk cartridges 34 are associated with the autoloader 12. A group of removable hard disk cartridges 35 are associated with the autoloader 13. A group of removable hard disk cartridges 36 are associated with the autoloader 14. A group of removable hard disk cartridges 37 are associated with the autoloader 15. Each cartridge within the groups 33–37 has a signature data written on it by the system 10 to identify its position in a redundant array. Therefore, given that there are five autoloaders 11–15, there will be five unique signatures that can be assigned to the cartridges within the groups 33–37. It is not necessary that any one particular signature type always be associated with any one particular autoloader 11–15. It is necessary that all five signatures be present and loaded on the autoloaders 11–15 for proper operation. Furthermore, the five signatures that are present must be on five separate cartridges that, between them, hold a complete data file. In other words, the five cartridges that were originally associated during a data storage operation by the memory system 10 must all be present in autoloaders 11–15 to effectively recover that data without there being any missing or incorrect parts. The exact distribution of the five cartridges amongst the autoloaders 11–15 need not be reestablished, because the signatures written on each cartridge will identify its array position in a reconstruction.

The autoloaders 11–15 each include removable hard disk cartridges and their matching disk drive units and have a mechanism for the automatic loading and unloading of removable cartridges from a magazine. The operation of the magazine is similar to that of a jukebox, where program control is used to select which cartridges in the magazine are to be loaded. The magazine therefore operates as a computer archive library that does not require human intervention for each mounting or dismounting of a cartridge in a drive within an autoloader.

Figure 2:
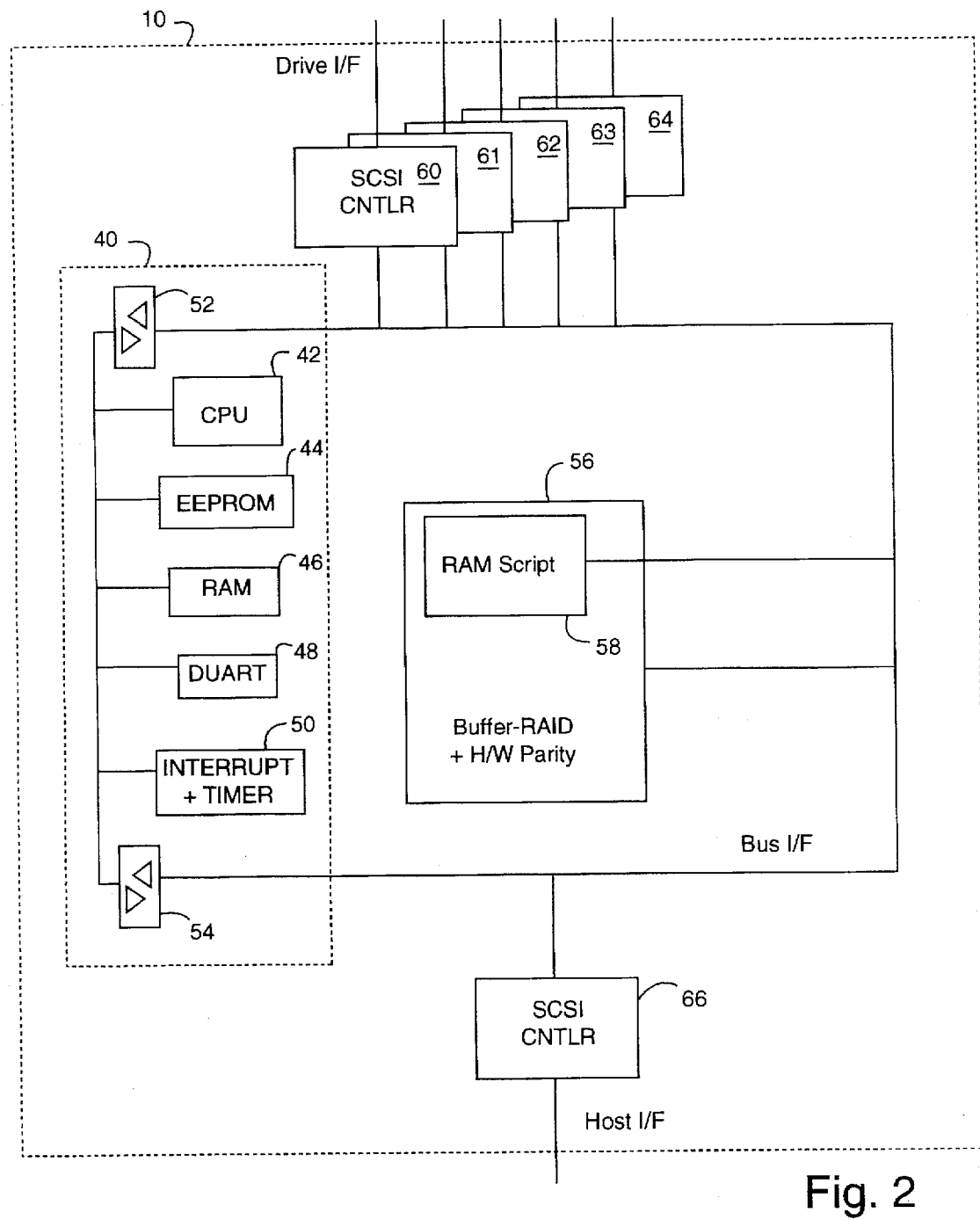
FIG. 2 is a block diagram of the hardware comprising the memory stem of FIG. 1.

FIG. 2 is a block diagram of the functional hardware elements of the memory system 10. A microcomputer 40 comprises a microprocessor 42, an electrically-erasable programmable read-only memory (EEPROM) 44, a random access memory (RAM) 46, a dual universal asynchronous receiver transmitter (DUART) 48, a combination interrupt and timer unit 50 and a pair of bi-directional databus interfaces 52 and 54. The microcomputer 40 may be implemented with a commercially available personal computer (PC), such as manufactured by IBM Corporation or Apple Computer Corporation. For example, the CPU 42 may comprise an Intel 486-type microprocessor. A redundant array of inexpensive disk drives (RAID) buffer 56 provides temporary data storage with hardware parity and includes a random access memory (RAM) computer program script 58. The parity is a cyclic redundancy code (CRC), e.g., that is the exclusive-or of all the data bytes. A drive used for storing parity may be one dedicated for the purpose. However, throughput can be improved by writing parity to all the storage drives and thus balance the distribution amongst the drives. A set of SCSI controllers 60-64 provides access to a corresponding array of removable hard disks, as described for the autoloaders 11-15. A similar SCSI controller 66 provides a port to a host computer that appears to the host as having a single SCSI drive. The SCSI controllers 60-64 and 66 may each, for example, include a integrated circuit SCSI controller, such as the National Cash Register Corporation model NCR-720.

Figure 3:
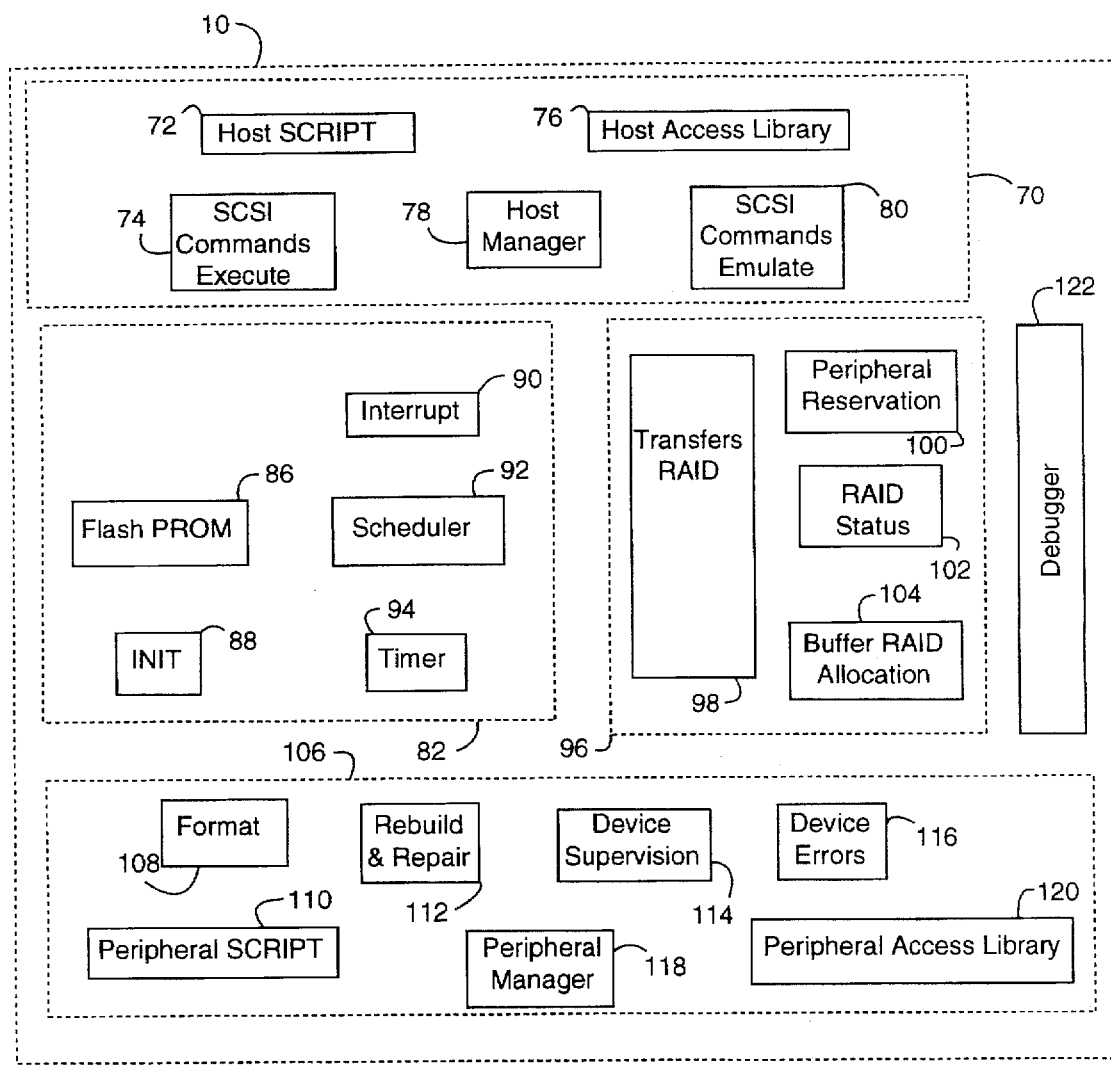
FIG. 3 is a block diagram of the computer program software comprising the memory stem of FIG. 1.

FIG. 3 is a block diagram of the functional software program elements of the memory system 10, which, for example, may all reside in machine code within the EEPROM 44.

A host interface 70 includes a host script 72, a host commands execution program 74, a host access library 76, a host manager 78, and a small computer system interface (SCSI) emulation program 80. The host interface 70 executes on the CPU 42 and concerns itself principally with responding to a host computer attached externally to the SCSI host controller 66.

A program 82 includes a flash PROM driver 86, an initialization routine 88 for boot-up, an interrupt handler 90 for the interrupt part of the interrupt and timer unit 50, a task scheduler 92 and a timer driver 94 for the timer part of interrupt and timer unit 50.

A redundant array program 96 includes a data transfer memory space 98 maintained in the RAM 46, a peripheral reservation program 100 to coordinate the SCSI controllers 60-64, a RAID status subroutine 102 and a RAID buffer allocation program 104 for the RAID buffer 56.

A peripheral interface program 106 includes a program 108 for formatting the removable disks handled by the autoloaders 11-15, a peripheral SCRIPT program 110, a rebuild and repair program 112 to fix soft errors and bad blocks detected on the disk media, a device supervision program 114, a device error handler 116, a peripheral manager program 118 and a peripheral access library 120. The peripheral interface program 106 works generally through the SCSI controllers 60-64 to control the autoloaders 11-15.

A debugger 122 allows programmer access to all parts of the programs included within programs 70, 82, 96 and 106 with a terminal connected to the DUART 48.

With interchangeable removable cartridges it is necessary to include in the data recorded on each one a "signature" to identify its particular redundant array position. Initially, each drive and its freshly formatted cartridge can have an array position identity arbitrarily assigned. But once data is written to a group of cartridges comprising an array, the order and sequence of the data distributed amongst the cartridges must be preserved. It is not strictly necessary that the drive hardware itself be reestablished in the same way it was originally configured during data storage. It is, however, necessary that program 96 be able to verify which cartridges are loaded in each drive. The sequence and order of data contained in each cartridge is then manipulated and shuffled by the program 96 for reconstruction of the original data as it had been presented on the SCSI host interface 28. Once each cartridge's signature has been recognized and accommodated, further data input/output operations may be supported at the SCSI host interface 28.

Data transfers over the SCSI interfaces 22-26 and 28 are block oriented. The memory space represented by the storage capacity of a disk drive is divided into a string of sequentially numbered blocks. The disk drive controller hardware converts the block-identified traffic to cylinder, surface, track and sector format. Sectors, tracks or surfaces with hard defects are typically mapped out of the sequence of blocks, with sequentially numbered blocks simply skipping over the defective recording areas.

Preferably, the data transfer rate of SCSI host interface 28 is substantially increased by the parsing of a series of blocks amongst the SCSI interfaces 22-26. For example, if the host sent SCSI blocks numbered 3001-3005 to the memory system 10 for storage, the data would be accepted by the host interface program 106, parsed into five separate blocks according to the signature of cartridges previously loaded by the RAID program 96, and sent out to each drive through SCSI controllers 60-64 by the peripheral interface program 70. Data blocks can also be distributed in groups amongst the available drives, e.g., with forty blocks to write, ten blocks are written on each of four drives.

The rate, therefore, that data can be accepted by the SCSI host interface 28 is essentially equal to the sum of the individual transfer rates of the SCSI peripheral interfaces 22-26. In order for this speed improvement to operate correctly, the SCSI controllers 60-64 are commanded in near parallel, both for data read and data write operations. Due to the tremendous difference in CPU speeds and disk I/O speeds, the overhead in time required by the CPU 42 to setup parallel SCSI operations and to parse the buffer 98 between the individual peripheral drives is minimal. Although the FIGS. 1-3 show five peripheral SCSI drives, other numbers of drives are useful. For example, as few as two would demonstrate the advantages of the present invention and as many as ten would show a substantial improvement over nine. In any event, it is essential that the number of drives remain fixed so that signatures written on each cartridge, e.g., cartridges 33-37, properly define all the members in a complete redundant array of drives.

In applications were the data reliability of information stored on cartridges within the groups 33-37 is critical, it is preferable to parse data among the first four groups 33-36 and to use the fifth group 37 to record error detection and correction (ECC) codes, e.g. syndrome blocks according to well-known polynomial functions. In such a case, the rebuilding and repairing program 112 has the further function of error detection and correction. Error detection and correction programs and hardware are universally available, and any number of such conventional techniques may be used in the memory system 10. In one such implementation, four cartridge disk drives provided two gigabytes of on-line storage and a fifth cartridge disk drive provided two-bit error detection and one-bit error correction for each byte of data stored.

Alternatively, the methods and apparatus described here may be adapted to whole disk drive units that can be plugged and unplugged from an array of sockets much like removable cartridges are used with their matching disk drives. It is immaterial to the present invention whether the recording head and actuator remain permanently matched with any one particular magnetic disk.

An error notification from the RAID to the host may alternatively be passed on by the host to the user. A spare drive or cartridge in a stack would be beneficial in that such a spare could be automatically swapped in by the system on detection of a failure of another drive or cartridge.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A computer data storage memory system (10), comprising:

a plurality of removable cartridge disk drives (33–37) for reading and writing data on interchangeable hard disk cartridges, wherein one of the plurality of removable cartridge disk drives is limited to reading and writing error correction and detection data;

a peripheral controller connected to each of the removable cartridge disk drives;

a host interface (28, 66, 70) having a host data input/output (I/O) port (30, 80) and connected to the peripheral controller;

data parsing means (96, 106) connected to the peripheral controller and the host interface for accepting data from said host data I/O port and for parsing, distributing and recombining said data amongst the plurality of removable cartridge disk drives according to a signature code recorded on a plurality of interchangeable hard disk cartridges then present in the plurality of removable cartridge disk drives;

a plurality of interchangeable hard disk cartridges (33–37) for loading into respective ones of the plurality of removable cartridge disk drives and each having a unique one of said signature codes;

signature assignment means (10, 28, 96, 106, 114) connected to the peripheral interface controller for recognizing the absence of a signature code in the plurality of interchangeable hard disk cartridges loaded into respective ones of the plurality of removable cartridge disk drives and for writing a unique one of said signature codes on respective ones of said hard disk cartridges;

first error detection and correction means (112) connected to the plurality of removable cartridge disk drives for generating correction codes for data received from said host data I/O port on the plurality of interchangeable hard disk cartridges;

second error detection and correction means (112) connected to the plurality of removable cartridge disk drives for reading data and correction codes received from the plurality of interchangeable hard disk cartridges and for correcting and rebuilding data that is forwarded to said host data I/O port; and a computer-implemented program (96) for verifying which set of the plurality of interchangeable hard disk cartridges are loaded in particular ones of the plurality of removable cartridge disk drives such that the sequence and order of data contained in each interchangeable hard disk cartridge is electronically manipulated and shuffled for reconstruction of the whole data as it had been originally presented to said host data I/O port.

2. A memory system (10), comprising:

a host interface (28, 66, 70) that presents the appearance of a single very large capacity hard disk storage drive;

a first through n-th group of drive controller interfaces (22–26, 60–64) connected to the host interface (28, 66);

a first through n-th group of removable media cartridge drives (33–37);

a plurality of unique signatures written on respective ones of each cartridge in a group of removable hard disk cartridges (33–37) to identify the position of each cartridge in a redundant array of the group of removable media cartridge drives (33–37), and initially each drive with a freshly formatted cartridge can have an array position identity arbitrarily assigned and once data is written to a group of cartridges comprising a particular array, the order and sequence of the data distributed amongst the cartridges is preserved by a program (96) that verifies which cartridges are loaded in each drive such that the sequence and order of data contained in each cartridge can then be manipulated and shuffled for reconstructing a copy of the original data file as it had been presented at the host interface (28);

wherein all the unique signatures in each group of interchangeable hard disk cartridges (33–37) are required to be present and all the interchangeable hard disk cartridges (33–37) in each group are identified by their respective signatures and provide for the communication of recovery information associated with a data file; and wherein, the exact physical distribution of the interchangeable hard disk cartridges (33–37) amongst the removable media hard disk drives need not be repeated for complete data file recovery as a consequence of the signatures which are written on each cartridge being able to provide array-position reconstruction information for the recovery of said data file.

3. The memory system of claim 2, wherein:

the drive controller and host interfaces (22–26 and 28) support block oriented data transfers and a memory space represented by the storage capacity of any particular disk drive is divided into a string of sequentially numbered blocks and block-identified traffic is converted to a cylinder, surface, track and sector format, wherein sectors, tracks or surfaces with hard defects are mapped out of said sequence of blocks and sequentially numbered blocks skip past any identified defective recording areas; and the host interface (28) has a data transfer rate that is substantially increased by a parsing of a series of blocks amongst the drive controller interfaces (22–26) such that data accepted by a host interface program (106) is parsed into separate blocks according to said signatures, and sent out to each drive through the controllers (60–64) by a peripheral interface program (70);

wherein, the rate that data is accepted by the host interface (28) is essentially equal to the sum of the individual transfer rates of the individual drive controller interfaces (22–26), and data read and data write operations are both commanded in near parallel within the controllers (60–64).

* * * * *